Figure 1:
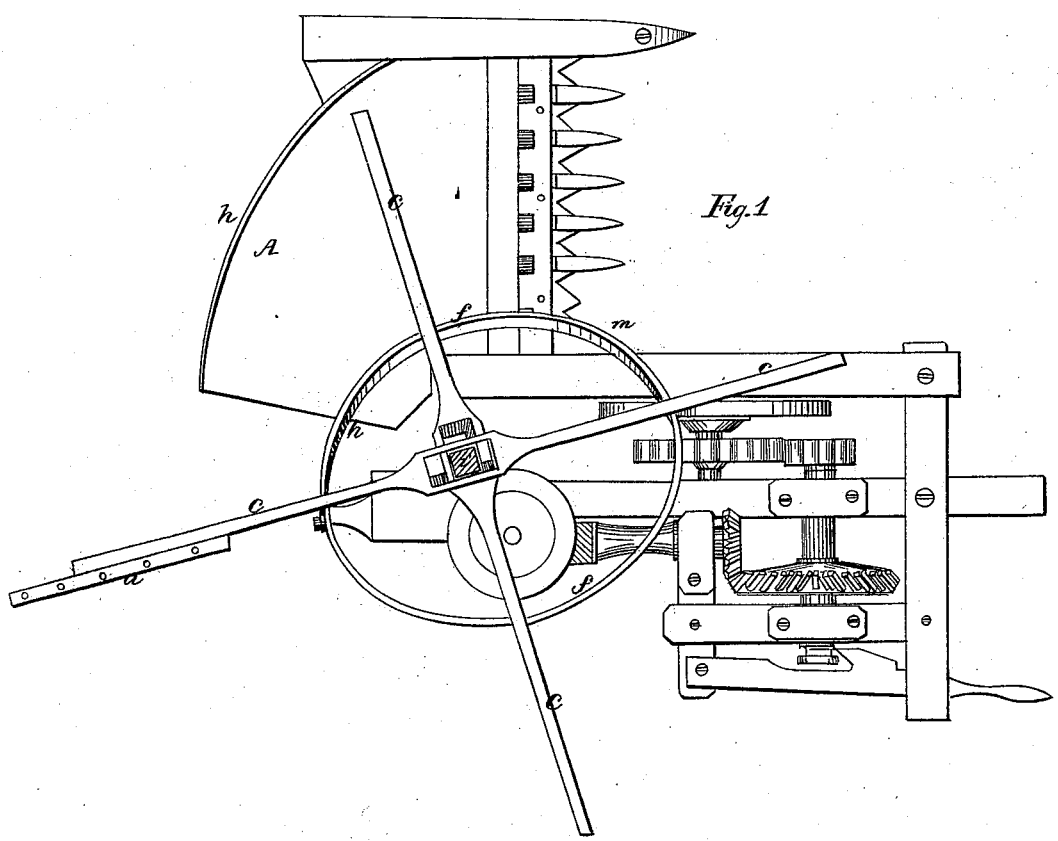

2 Sheets—Sheet 1.

O. DORSEY.

Harvester-Rakes.

No. 14,350.

Patented Mar. 4, 1856.

O. DORSEY.
Harvester-Rakes.
No. 14,350.
2 Sheets—Sheet 2.
Patented Mar. 4, 1856.
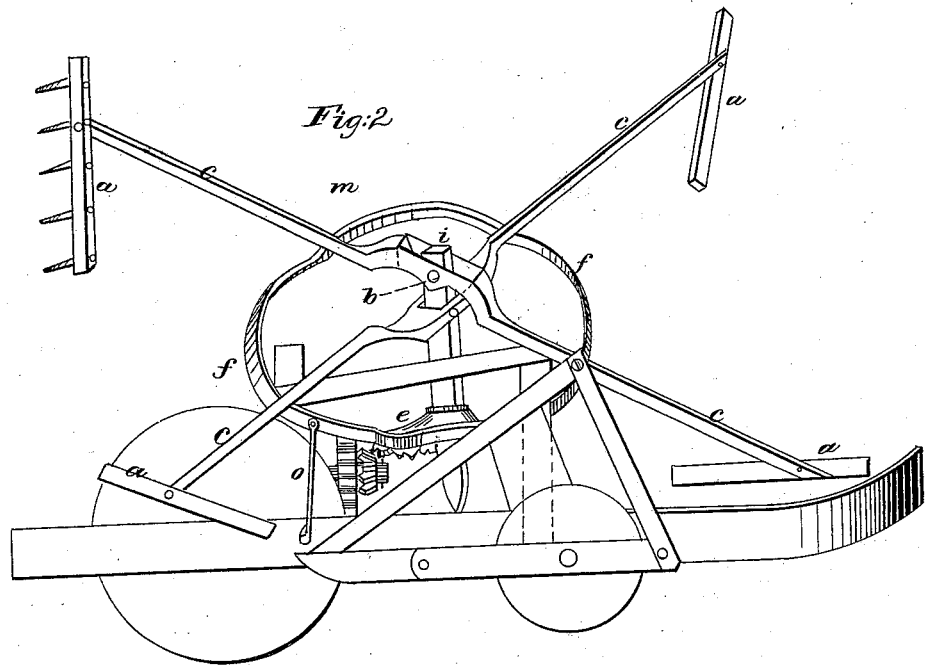
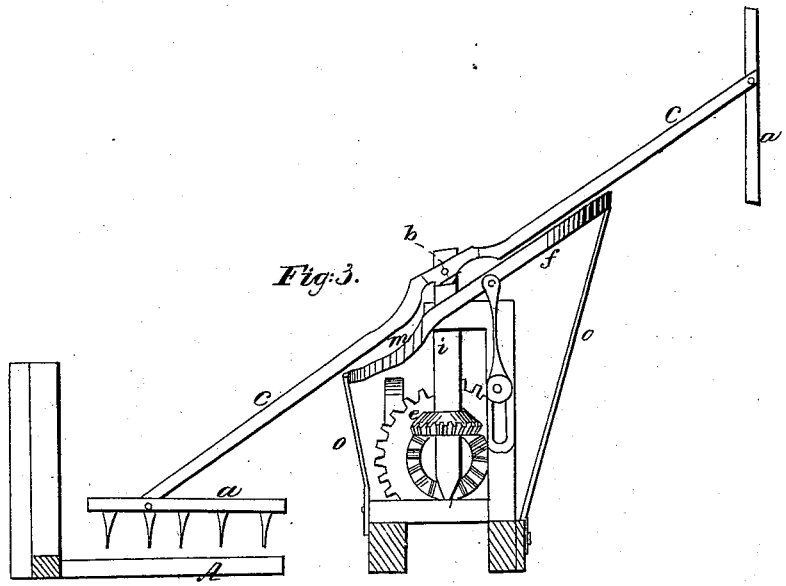

UNITED STATES PATENT OFFICE.

OWEN DORSEY, OF HOWARD COUNTY, MARYLAND.

IMPROVEMENT IN HARVESTER-RAKES.

Specification forming part of Letters Patent No. 14,350, dated March 4, 1856.

*To all whom it may concern:*

Be it known that I, OWEN DORSEY, of Howard county, and State of Maryland, have invented certain new and useful Improvements in Rakes for Harvesting-Machines; and I do hereby declare that the following is a full, clear, and exact description thereof, reference being had to the accompanying drawings, forming a part of this specification, of which—

Figure 1 is a top view; Fig. 2, a side elevation, and Fig. 3 an end elevation.

The improvement consists of a revolving rake formed with four arms, $c\ c\ c\ c$, each pair of arms formed of metal or wood with an opening at their half-length of a longitudinal form, so as to allow them to pass over the end of a vertical turning shaft. $a\ a$ are rake-heads attached to the arms $c\ c$ at a suitable angle. $i$ is the vertical shaft, having its upper end squared, so as to receive the arms over it. A bolt, $b$, passes through the sides of the arms at the mortise or opening, and also through the shaft $i$, and upon this bolt the arms have a partial vibratory movement allowed them. The vertical shaft has rotation communicated to it by a suitable gear-wheel, $e$, from the master-wheel. $f\!f$ represent semicircular portions of a rail, upon which the arms $c$ have their movement, and with the view of facilitating the travel thereon the arms may be furnished with friction-rollers. The rails serve as guides in bringing the rakes to the platform, and, after their passing over it, elevate the arms out of the way, and to accomplish this result the railway at the junction of the half-circles, instead of being continuous, is joined by short inclined portions $m$. (See Fig. 3.) The object of these is to permit the arms of the rakes to be suddenly dropped at the cutting-edge of the platform; and as suddenly raised at the delivery side thereof. The main portions of the rail are also inclined at or near an angle of forty-five degrees to the shaft $i$, and the tendency of the slope is toward the platform. The general arrangement is such that the rake-head is brought by a sweeping descent upon the front edge of the platform, and in so doing draws the uncut grain toward the cutters. Then the rake passes over the platform with a sweep or quarter-circle and forms a side delivery at the rear of the driving-wheel. $h$ is a curved fender-board raised on the nose edge of the platform A. The machine in the cutting and gearing portions is such as now in use. The railway-circles $f\!f$ are supported by suitable metal rods, O O, and by these rods it may be adjusted.

The operation of the rake is as follows: As the rake-head passes over the platform A its movement is horizontal, the arm C passing over the rail from $m$ to $h$, Fig. 1; but on reaching the edge of the platform the rake-head is suddenly raised by the arm passing up the incline $m$ (see Fig. 3) of the guide-rail, while the rake and opposite end of the arm drops at a corresponding incline, and by continuing its movement the rake reaches over the heads of the grain, and, gradually descending by the guide-rail, draws the wheat toward the cutters. By this means I dispense entirely with the reel used on harvesters for drawing the grain to the cutters, and by the quick inclines at $m$ the lifting and descent of the rakes are rapidly performed, while in the movement of the rake over the platform it is slow and steady, thus preventing anything like scattering of the grain in its side delivery, and the deposit of it is made in proper gavels or bundles out of the track of the next round of the machine. The rakes and arms, being balanced, work with little expenditure of power, and, being exceedingly simple, are not liable to be thrown out of order. Besides, the small expense of adapting it to harvesters now in use is not to be overlooked.

Having described my improvement in rakes for harvesters, what I claim as my invention, and desire to secure by Letters Patent, is—

The combination, with the rake-arms $c\ c$, to which the rakes are firmly attached, of the vertical revolving shaft $i$ and camway or guide $f\!f\ m\ m$, from which the rake-arms receive an undulating motion in a vertical plane, revolving about said shaft $i$, substantially in the manner and for the purposes set forth.

In testimony whereof I have hereunto signed my name before two subscribing witnesses.

OWEN DORSEY.

Witnesses:
JOSHUA A. THOMPSON,
ROBERT BROWN.